United States Patent [19]

Jennings et al.

[11] 3,983,701
[45] Oct. 5, 1976

[54] MODULATING CONTROL FOR HYDROSTATIC DRIVE

[75] Inventors: Marvin D. Jennings, Naperville; Rodger W. Asmus, Downers Grove, both of Ill.

[73] Assignee: International Harvester Company, Chicago, Ill.

[22] Filed: June 30, 1975

[21] Appl. No.: 591,786

[52] U.S. Cl. ............................ 60/465; 60/468; 60/488; 91/459
[51] Int. Cl.[2] ........................................ F16H 39/46
[58] Field of Search ............ 60/464, 465, 470, 471, 60/487, 488, 490, DIG. 2, 444, 468; 91/459

[56] References Cited
UNITED STATES PATENTS

| | | | |
|---|---|---|---|
| 3,383,857 | 5/1968 | Rajchel et al. | 60/465 X |
| 3,398,530 | 8/1968 | Prevallet et al. | 60/465 X |
| 3,398,531 | 8/1968 | Swanson et al. | 60/466 |
| 3,583,157 | 6/1971 | Adams et al. | 60/488 X |
| 3,667,226 | 6/1972 | Asmus et al. | 60/489 |
| 3,739,578 | 6/1973 | Roeske | 60/465 X |

*Primary Examiner*—Edgar W. Geoghegan
*Attorney, Agent, or Firm*—Douglas W. Rudy; Floyd B. Harman

[57] ABSTRACT

A normally closed solenoid valve operates conjunctively with a two position pilot valve to limit the amount of engine braking through the drive train of a vehicle by reducing the drive relief valve setting in the disengaged side of a hydrostatic transmission. A second normally closed solenoid valve operates a second two position pilot valve to modulate the rate that the forward drive relief valve in the engaged side of the transmission hydrostatic drive loop permits drive pressure to build up as the vehicle is started in motion. An electrical switch on the transmission control rod initiates activation of the normally closed solenoid valves when the vehicle operator selects a direction of travel.

12 Claims, 2 Drawing Figures

MODULATING CONTROL FOR HYDROSTATIC DRIVE

BACKGROUND OF THE INVENTION

1. Field of the Invention

This invention relates to hydrostatic transmissions and more particularly to a control circuit which automatically limits engine braking and which also modulates drive pressure build up as the vehicle is initially placed in motion.

2. Background of the Invention

It is well known to provide a hydrostatic transmission in the power train of vehicles to transmit motive force from the vehicle engine to the drive wheels of the vehicle. The hydrostatic transmission does have several drawbacks and objectionable characteristics however. One of the more objectional characteristics is that upon engagement of the hydrostatic transmission into either forward or reverse, a severe jolt or alternatively an excessively high acceleration rate is experienced. This is most noticeable when the vehicle is being operated by a novice operator.

Also a characteristic of a basic hydrostatic transmission is the severe deceleration normally encountered when a speed reduction is initiated by the vehicle operator. When the operator moves the transmission control lever, be it a foot pedal or a hand operated control rod to a lower speed position, the vehicle is momentarily in a coast situation. The reverse loop of the hydrostatic transmission would suddenly be pressurized and vehicle inertia would be driving back through the transmission. This would result in a deceleration rate which would be uncomfortably high.

A similarly high deceleration rate would be experienced in state of the art hydrostatic transmissions if the vehicle operator suddenly moves the control lever to the reverse position when the vehicle is in a forward traveling direction.

Inventions directed toward the control of hydrostatic transmissions countering the aforesaid situations have been disclosed, however, the present invention teaches previously unattainable benefits.

SUMMARY OF THE INVENTION

In accordance with the invention there is disclosed a modulating control system for use on hydrostatic transmissions which is responsive to the drive selector lever of a vehicle. Signals are propagated through the system by initial activation of a switch which is electrically communicative with a normally closed neutral position solenoid valve. A switch responsive to the forward position of the drive selector level and a second switch responsive to the reverse position of the drive selector lever is provided. A solenoid valve is provided to communicate between each switch and one of two, either forward or reverse, two position pilot valves.

Each two position pilot valve communicates with one of the solenoid valves and regulates fluid flow from a drive relief valve at the hydrostatic transmission pump-motor assembly in response to fluid dispatch of the solenoid valve initiated by the operator's positioning of the drive selector lever in respect to the electrical switches.

Therefore it is an object of the invention to provide a system for controlling the engagement of a hydrostatic transmission to avoid unnecessary rapid acceleration and the attendant rough starts when starting from rest.

It is further an object of this invention to provide a limit to the amount of engine braking through the vehicle drive train and to provide a comfortable rate of deceleration. Another object of the invention is to provide for a smooth transition from forward vehicle motion to rearward vehicle motion (or vice versa) while at the same time controlling the deceleration rate and acceleration rate at reasonable levels not uncomfortable to the operator. Also an object of the invention is to provide for electrical operation of a hydraulic control means that presents a modulated control of a hydrostatic transmission.

Another object of the invention is to provide modulation of both the forward drive relief valve and the reverse drive relief valve of a conventional hydrostatic transmission.

Another object of the invention is to provide a hydrostatic transmission control means, the operation of which is coordinated with other transmission control means which are operatively communicative to provide the selection of forward, neutral, and reverse.

Still a further object is to provide modulated acceleration as well as deceleration control that is readily adapted to foot pedal type transmission control valves.

BRIEF DESCRIPTION OF THE DRAWINGS

The foregoing and other objects and features of the invention will become apparent upon comprehension of the following detailed description of the preferred embodiment of the invention as illustrated in the accompanying drawings in which.

DETAILED DESCRIPTION OF THE DRAWINGS

Figure 1:
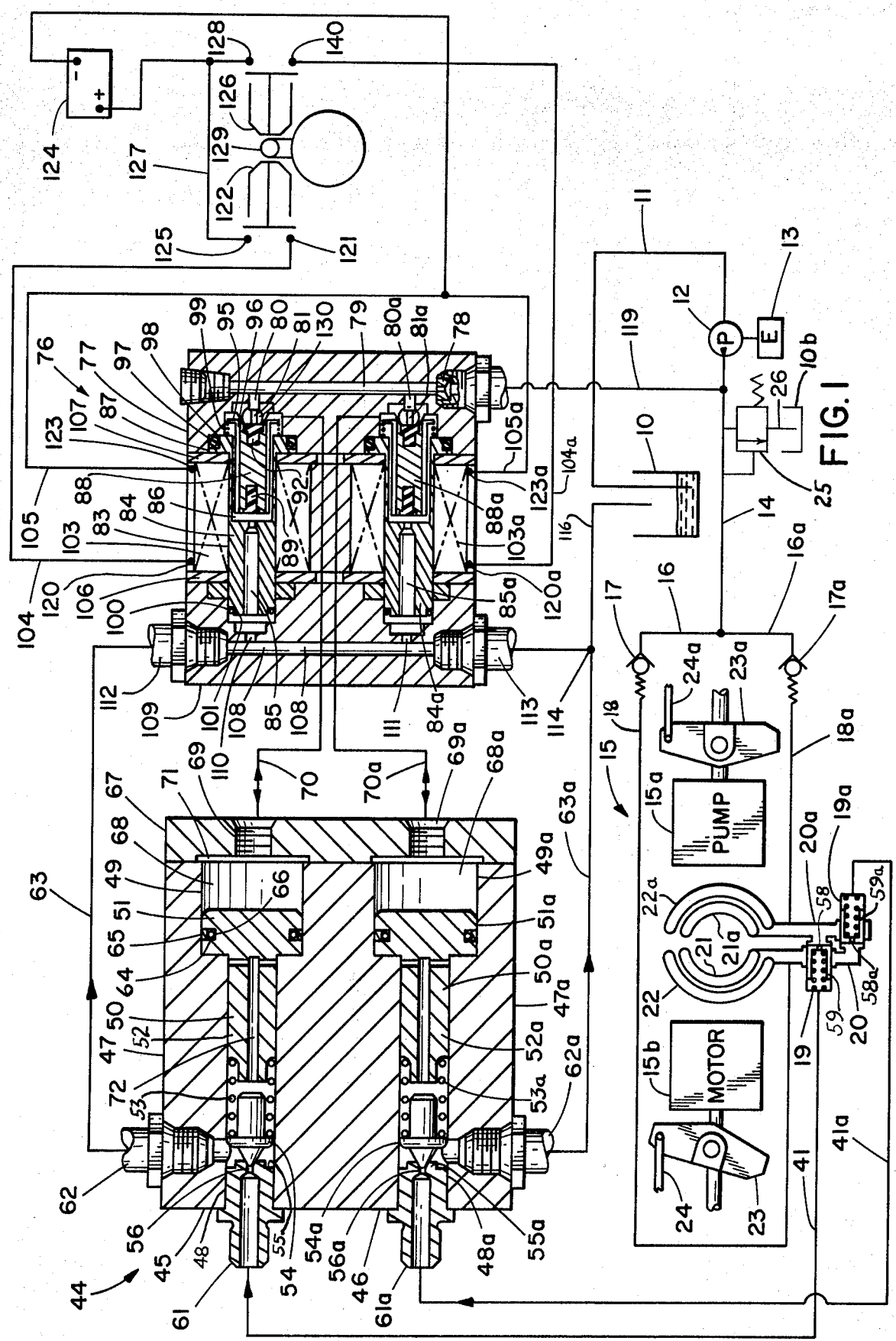
FIG. 1 is an illustration of the electrical, mechanical, and fluid circuit features of a transmission, showing some components sectioned, embodying the present invention.

Referring now to the drawing FIG. 1 where there is presented a general representation of a portion of a hydrostatic transmission of the type customarily incorporated in vehicles for propulsion thereof, it will be seen that only the components of the system pertaining to the instant invention are included. In being understood that other components may be employed in the system without deviating from any of the inventive concepts hereof.

A fluid reservoir 10 connects by conduit or passage 11 with the inlet of a fluid supply pump 12 which may be driven by suitable means such as the engine indicated as 13. An outlet of pump 12 communicates through conduit 14 with an inlet of motor-pump unit generally designated by reference numeral 15. The fluid supply pumps 12 supplies the charge or make-up fluid to the motor-pump unit 15. It will be understood that the pump component of the motor-pump unit 15 will be operatively connected to suitable drive means such as the vehicle engine. The motor component of the motor-pump unit 15 will be suitably connected to other equipment such as the drive train of a vehicle (not shown) to drive said vehicle.

Since the motor-pump unit 15 is generally conventional, such as, for example, the hydraulically interconnected and back-to-back arranged motor-pump unit shown as 15, no extensive elaboration of the operating details thereof need be included herein.

A pressure relief valve 25 communicates with conduit 14. This relief valve is set to maintain a low pressure at all times in the hydrostatic transmission loop. When pressure exceeds the setting of the pressure relief valve 25 excess fluid passes from the charging pump 12 to a reservoir 10b via pressure relief valve discharge conduit 26.

Conduit 14 connects into the motor-pump unit 15 by way of a pair of conduits 16 and 16a which connect into respective check valves 17 and 17a of the conventional motor-pump unit 15 while the outlet sides of the latter valves open into the respective conduits 18 and 18a which in turn connect at one end thereof into the respective sides of the conventional hydrostatic drive loop. The outlets of a pair of high pressure drive relief valves 19 and 19a are cross connected by conduits 20 and 20a with the respective inlets of high pressure drive relief valves 19a and 19 so as to bypass a large flow of fluid therebetween upon opening of either one of these high pressure drive relief valves 19 or 19a as a result of an excessively high pressure in the associated circuit. The opposite ends of conduits 20 and 20a communicate with the kidney shaped ports 21, and 21a, and 22 and 22a at the respective motor 15b and pumps 15a.

The check valves 17 and 17a, the high pressure drive relief valves 19 and 19a, the pump unit 15a and the motor unit 15b with their respective kidney shaped ports 21, 21a, and 22, 22a can be housed as a single unit thus allowing conduits 20 and 20a to be formed as passages in the assembly rather than individual conduit lines.

The motor swash plate 23 and the pump swash plate 23a are operatively connected to displacement adjustment means 24 and 24a which can be either switchable mechanical linkages (not shown) or appropriate servos and servo actuating means (not shown) such that the swash plates can be adjusted according to well known principles of operation of such mechanisms.

As the high pressure drive relief valves 19 and 19a are generally conventional an explanation of one valve only will be recited. Elements in each valve are identical.

Each high pressure drive relief valve (reverse being 19 and forward being 19a) has an outer sleeve like body that slidably accommodates a sleeve valve 59 in the body which normally abuts a snap ring mounted in a recess of the body. A spring is positioned between an interior end portion of the body and the apertured end of the sleeve valve 59 to continually bias the sleeve valve 59 against the snap ring. The interior end portion of the body communicates with the pilot control conduit 41.

Pilot control conduits 41 and 41a communicate with the pilot relief valve assembly generally indicated by 44. This assembly is composed of a set of pilot relief valves 45 and 46, one of which communicates with the reverse drive relief valve 19 and another of which communicates with the forward drive relief valve 19a respectively.

As both pilot relief valves are identical in structure only one pilot relief valve will be explained in detail. The second pilot relief valve is annotated with the same reference characters as the pilot relief valve being explained except that the second pilot relief valve has the suffix a appended to the reference characters.

Each pilot relief valve is encased in a body 47 which is equipped with a cylindrical bore 48 having a counter bored portion 49. The bore 48 slidably contains a piston 50 having an enlarged portion 51 located in counterbored portion 49 while the main portion 52 is slidably mounted in bore 48. A spring 53 is positioned between piston 50 and a pilot poppet element 54 biasing the pilot poppet element toward a seat 55 which has been secured in bore 48. Seat 55 is equipped with a controlled flow orifice 56 which communicates with pilot control conduit 41 which is attached to the seat by means of a threaded coupling 61. An outlet opening 62 communicates with the interior of bore 48 and is connected by suitable conventional means with the conduit 63.

Spring 53 is selected or shimmed to provide the desired biasing of poppet 54. Spring 53 biases the poppet with minimum force when piston 50 is positioned against end plate 67. This force is selected to provide the desired vehicle deceleration rate as is determined by pressure build up in conduits 20 and 20a. This minimum pressure is maintained higher than charge pressure as controlled by valve 25. When piston 50 has maximum entrance into bore 48 spring 53 exerts maximum force against poppet 54. This force on poppet 54 and the force of spring 53a on poppet 54a controls the maximum designed pressure build up in the transmission conduits 20 and 20a for propelling the vehicle.

The enlarged portion 51 of the piston is equipped with an axial groove 64 having a seal which may be of a two part construction such as a ring 65 and an O-ring 66. The main portion 52 of piston 50 is provided with a passage 72 which allows the passage of fluid therethrough. It will be noted that a small space is provided between the ends of the poppet stem and the end of the piston 50 so as to permit limited movement of the poppet without displacing the piston 50.

The pilot relief valve 44 may contain both the reverse and second forward 45 and 46 respectively pilot relief valves. An end plate 67 is positioned over the counterbored portion 49 of the bore 48 forming a chamber 68. The end plate is equipped with a threaded aperture 69 which allows accommodation of conduit 70. End plate 67 is also provided with a recess 71.

Conduits 70 and 70a communicate directly with the dual cylinder solenoid operated valve generally designated by 76. A housing 77 contains two identically operating valves of which only one will be described in detail herein with the note that the second of the two valves has major and significant reference characters suffixed with an a identifying identical parts in each valve.

A flow controlling inlet orifice 78 communicates with passage 79 having conduit branches 80 and 80a appended thereto, each branch having a restricting orifice 81 at the termination point thereof. The flow controlling inlet orifice 78 is sized to allow a metered amount of fluid to pass through the dual cylinder solenoid operated valve 76 to the pilot relief valve assembly 44. The size of the inlet orifice is related to the volume of chambers 68 and 68a of the pilot relief valve assembly 44 such that the displacement rate of the pistons 50 and 50a are controlled. A cylindrical cavity 83 is formed in the housing 77 which is occupied by a nonmovable sleeve 84 having a restrictive passage 85 axially formed through one end thereof and a bore 86 at the opposite end thereof and further having a lip 87 equipped with a seal 97 carried in recess 98 preventing movement of the sleeve 84 in cylindrical cavity 83. The piston 88 is slidably mounted in bore 86 said piston having a resiliently deformable insert 89 mounted in a recess in the innermost end and a second resiliently deformable insert 92 mounted in a recess in the outer end of the piston 88. The piston 88 is furnished with longitudinal exterior grooves one shown as 96 which allow fluid to pass past the piston. The piston is normally biased by spring 99, positioned between the top outermost surface of lip 87 and the nonmovable sleeve 84 and the innermost side of a flange 95 on the outermost end of piston 88, such that the second resiliently deformable insert 92 blocks flow through the restricting orifice 81. Piston 88 is of a limited length such that when spring 99 has urged the piston fully against the valve seat 81 of the conduit branch there is a void formed between the innermost end of the piston and the bottom of bore 86. The passage 85 communicates unimpeded with this void in this situation.

A port 130 allows fluid communication with conduit 70 when piston 88 has been moved to compress spring 99 and consequently open the restricting orifice 81.

The passage of fluid between the nonmovable sleeve 84 and the parameter of the cylindrical cavity 83 is prevented by the presence of an o-ring 100 carried in a recess 101 at the lipless end of nonmovable sleeve 84.

A solenoid coil 103 encases the mid-section of the nonmovable sleeve 84. Said solenoid coil being connected to a power source and a switch by first electrical conduit means 104 and second electrical conduit means 105. Said solenoid coil is further retained in position by flanges 106 and 107 of the body or housing 77. A passage 108 through end cap 109 is equipped with two branches 110 and 111 said branches communicating directly with the passages 85 and 85a in the nonmovable sleeves 84 and 84a. First inlet opening 112 receives fluid from conduit 63 while the second inlet opening 113 is capable of receiving fluid passage through conduit 63a. Fluid from conduit 63 passes into first inlet opening 112 thence through passage 108 and out the second inlet opening 113 to join with the fluid from conduit 63a by means of a tee 114, which communicates with reservoir 10 via the conduit 116. Pump 12 is capable of receiving fluid from reservoir 10 by means of conduit 11 and delivering said fluid to the flow controlling inlet orifice 78 of the dual cylinder solenoid operated valve 76 by means of conduit 119.

Electrical conduit 104, 104a and 105, 105a communicate between the dual cylinder solenoid operated valve and a drive selector switch as follows:

Conduit 104, terminally connected to solenoid coil 103 at point 120 proceeds to a first terminal 121 of a normally open reverse switch schematically represented by 122 while conduit 105 terminally connected to solenoid coil 103 at point 123 proceeds to a source of electrical energy such as battery 124. The battery is electrically communicative with reverse switch 122 at terminal 125 by means of conduit 127.

Conduit 104a terminally connected to solenoid coil 103a at point 120a proceeds to a first terminal 140 of a normally open forward switch schematically represented by 126 while conduit 105a terminally connected to solenoid coil 103a at point 123a proceeds also to battery 124 after being joined by conduit 105. The battery is electrically communicative with the forward switch 126 at terminal 128 by means of conduit 127.

A drive selector rod 129 is movably mounted between the forward and reverse switches 122 and 126 such that contact of either switch with rod 129 will facilitate electrical closure of subject switch.

Figure 2:
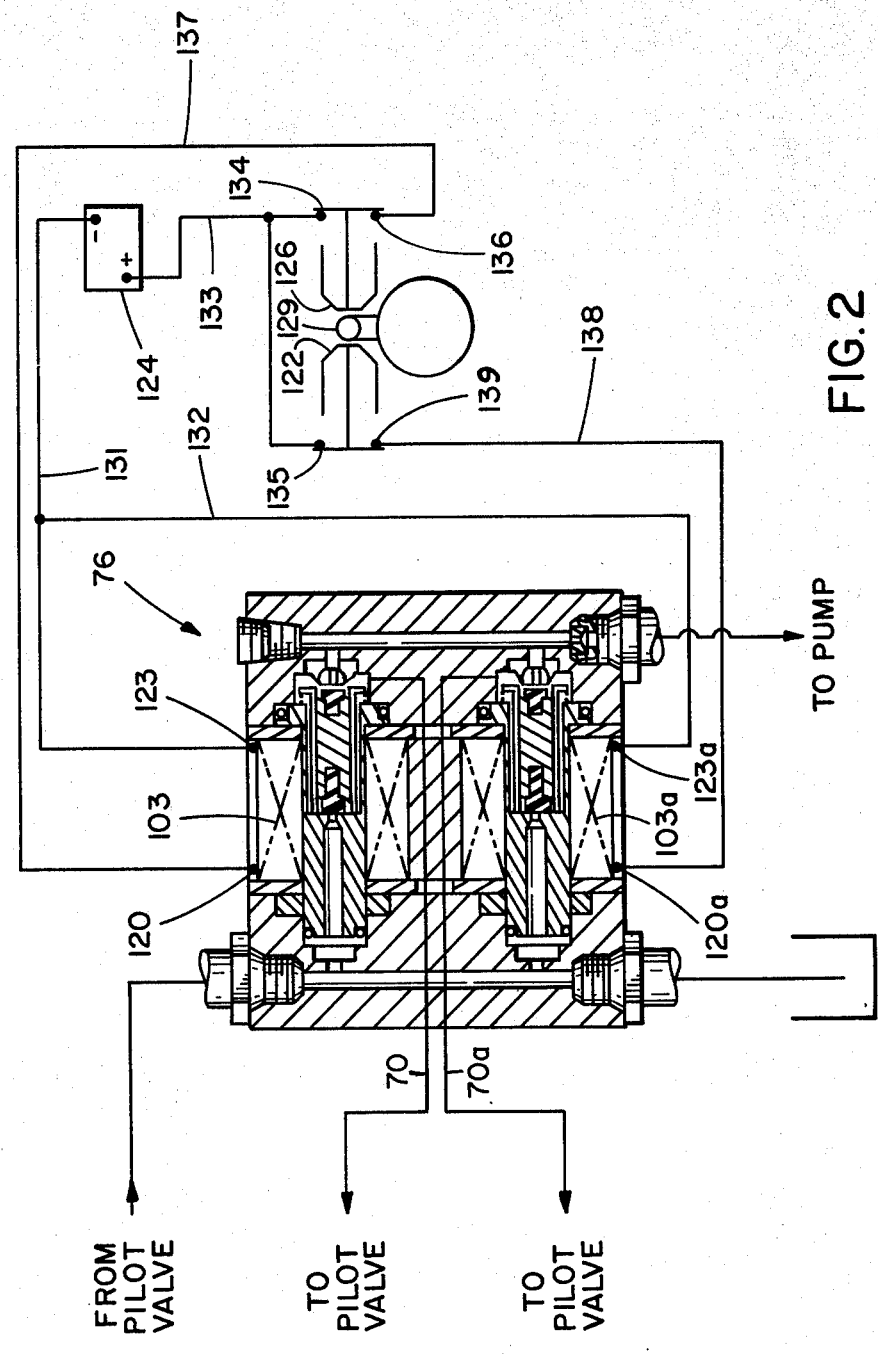
FIG. 2 is a schematic electrical diagram of an alternative embodiment of the invention.

FIG. 2 shows an alternative electrical configuration whereby the reverse switch 122 and the forward switch 126 are normally closed switches rather than normally open switches as shown in FIG. 1. Electrical conduit 131 passes from the battery 124 to terminal 123 and also to terminal 123a by means of conduit 132. Conduit 133 provides passage for electrical current from battery 124 to the forward switch terminal 134 and the reverse switch terminal 135. As these are normally closed switches current from terminals 134 and 135 will immediately pass to terminal 136 of the forward switch and terminal 139 of the reverse switch. Terminal switch 136 of the forward switch communicates via conduit 137 with terminal 120 of the solenoid coil 103 while terminal 139 of the reverse switch communicates via conduit 138 with terminal 120a of the solenoid coil 103a.

In the component configuration as shown in FIG. 1 the modulating control for hydrostatic transmissions will operate as follows:

The operator will engage the transmission by manipulating a foot pedal or alternatively a lever that will signal the hydrostatic pump to begin to increase its stroke such that an increased amount of fluid passes from the pump to the hydrostatic motor. The operation entails adjusting the swash plate angle of the pump either by a mechanical linkage or a servo assisted hydraulic linkage with the latter being more widely used in contemporary vehicles.

The drive selector lever 129 moves conjunctively with the aforementioned foot pedal or lever such that activation of the modulated control is initiated. In a reverse drive selection the reverse switch 122 is closed by the drive selector lever 129 such that solenoid 103 is energized which in turn urges piston 88 against spring tension from spring 99 allowing the uncovering of the restricting orifice 81 and the closing of passage 85. Fluid under pressure in inlet passage 79 passes through conduit branch 80 into the cylinder port 130 thence to chamber 68 by means of conduit 70. As fluid pressure builds in chamber 68 piston 50 moves deeper into the cylinder bore 48 increasing the closing pressure that poppet 54 exerts against seat 55 as transmitted by spring 53 restricting fluid flow from conduit 41 to conduit 63. This is a gradual restriction that provides for a smooth acceleration by allowing limited pressure build up in the hydrostatic circuit as reverse drive relief valve 19 will be initially allowed to be unseated due to the slight fluid pressure in the conduit 41. As the pressure in conduit 41 builds due to the gradual closing of the pilot poppet valve 54 the pressure at the reverse drive relief valve 19 in the hydrostatic transmission loop will also build. Once pilot poppet valve 54 is fully seated at high pressure no fluid can pass through either pilot this poppet valve or the reverse drive relief valve as long as the maximum design relief pressure is not exceeded. In a case where this pressure is exceeded the pilot poppet valve 54 will come off the seat through the further compression of spring 53. The hydrostatic transmission is essentially "locked up" in a reverse drive mode. When the operator shifts to a neutral position (i.e. the drive selector level 129 will not be in contact with either the forward or the reverse switches) from the reverse position both chambers 68 and 68a will be depressurized. The fluid recently in chamber 68 for the reverse drive of the transmission will pass through conduit 70 to cylinder port 130 then through axial grooves 96 in the piston 88 to the innermost end of the piston and the void space there, through the passage 85 in the nonmovable sleeve, through branch 110 of passage 108, to reservoir 10 by way of conduit 116.

In a rapid shift from reverse to forward direction the following sequence of transitional events will take place. The reverse pilot relief valve 45 will start out at a full pressure setting due to the energized state of the solenoid 103 and the subsequent fluid pressure in chamber 68. As there is no appreciable fluid pressure in chamber 68a the forward pilot relief valve 46 will be in a low pressure state such that poppet 54a presents only minimal pressure restriction to fluid in line 41a.

As the operator shifts the lever to the forward position the chamber 68 is depressurized and chamber 68a is pressurized as the result of the drive selector lever 129 closing the forward switch 126, which energizes the solenoid 103a, allowing piston 88a to move off restricting orifice 81a, causing flow through passage 70a.

While chamber 68a is being pressurized at a controlled rate due to the restricted fluid flow resultant from the controlling inlet orifice 78, chamber 68 is being depressurized as a portion of the fluid which pressurized chamber 68 will pass through conduit 70 to cylinder port 130 then through axial grooves 96 in the piston 88 to the innermost end of the piston in the void space formed therein, through the passage 85 in the nonmovable sleeve thence through branch 110 of passage 108 to reservoir 10 by way of conduit 116.

The net result of this pilot relief valve activity is that the vehicle will slow gently from the reverse direction of travel, imperceptibly stop, then gently accelerate in the forward direction of travel.

Pilot operation of the reverse and forward drive relief valves is conjunctively dependent on the position of the drive selector lever. As earlier stated the drive selector lever may also be linked to a servo assisted swash plate adjustment means which is capable of adjusting the swash plate of either (or both) the hydrostatic motor and the hydrostatic pump. Therefore in going from reverse to forward the direction of fluid flow is reversed in the hydrostatic transmission in the conventional manner. Pilot operation of the reverse and forward drive relief valves 19 and 19a is sequenced as follows: First, the pilot poppet valve 54a begins to allow flow due to pressure build up in conduit 41a, which in turn allows displacement of the forward drive relief valve 19a allowing partial short circuiting of the transmission. This causes a gradual deceleration of the vehicle. As the direction of fluid flow through the hydrostatic transmission is reversed due to the operator's manipulation of the drive selector lever 129 affecting the swash plate control servo means, the forward drive relief valve is unseated as there is only minimal pressure in conduit 41a leading to the forward pilot relief valve 46. In other words, forward drive relief valve 19a is unseated allowing partial short circuiting of the hydrostatic loop. Until pressure builds in line 41a the forward drive relief valve will remain unseated. This pressure is built through the closing of poppet 54a onto seat 55a of the forward pilot relief valve 46. This valve operates exactly as the reverse pilot relief valve previously explained. The gradual pressure buildup facilitated by poppet 54a being seated on seat 55a with ever increasing pressure from spring 53a forces the buildup of the pressure in conduit 41a until the valve 19a is again seated preventing short circuit flow through the hydrostatic transmission.

When the operator wishes to go into a forward mode of travel from a dead stop the drive selector lever 129 is positioned to close the forward switch 126 which results in activation of the solenoid coil 103 and the forward pilot relief valve 46 linked into the forward system. This operation is identical to that previously described for going into reverse travel. All the components work as previously described only the final outcome is a forward direction of the vehicle rather than a reverse direction of the vehicle due to the direction of flow through the hydrostatic transmission 15.

Another alternative embodiment of the present invention entails the use of a normally closed reverse switch and a normally closed forward switch rather than the normally open switches shown in FIG. 1. FIG. 2 is a schematic representation of this alternative system. The only changes between FIG. 1 and FIG. 2 takes place in the electrical system between the drive selector lever 129 and the solenoid coils 103 and 103a. The wiring to the reverse circuit proceeds from battery 124 to solenoid 103a by means of conduit 133, through normally closed reverse switch 122, thence to solenoid 103a by conduit 138. Terminal 123a, attached to conduit 132, completes the electrical circuit to the battery 124 through conduit 131.

The wiring for the forward circuit runs from the battery 124 to the forward switch 126 by means of conduit 133, through the normally closed forward switch 126. Conduit 137 then connects terminal 136 of the forward switch 126 to terminal 120 of the solenoid coil 103. The remaining equipment in this embodiment is identical to that previously described in FIG. 1. As can be expected there is a completely different operating function of the invention when the forward and reverse switches 126 and 122 are of the normally closed type rather than the normally open type as shown in FIG. 1.

Under this embodiment when the drive selector lever 129 is in the neutral position as shown in FIG. 2 both solenoid coils 103 and 103a will be energized allowing flow through the passages 70 and 70a into the chambers 68 and 68a. This pressure of fluid in the chambers 68 and 68a will force both poppet valves 54 and 54a against seats 55 and 55a, preventing flow through lines 41 and 41a and the unseating of the reverse drive relief valve 19 and the forward drive relief valve 19a except in cases where the design specifications are exceeded. As these drive relief valves, 19 and 19a will remain on their seats the hydrostatic transmission loop, generally designated as 15, will remain in a "locked" mode. Even though the hydrostatic transmission is in the locked mode there is no motion output due to the destroked condition of the pump swash plate.

The advantage here is that the vehicle will be locked in a stationary position and would be able to, for instance, hold in one position on a grade without moving forward.

Thus, it is apparent that there has been provided in accordance with the invention the modulating control for hydrostatic drive that fully satisfies the objects, aims and advantages as set forth above. Although the invention has been described in conjunction with two specific embodiments thereof, it is evident that many alternatives, modifications, and variations will be apparent to those skilled in the art in light of the foregoing description. For example, the invention might be equally utilized with varying and specific degrees of poppet valve pressure on the pilot relief valve seats. Also several different flow paths may be envisioned between the outlet openings of the two positioned pilot valves and the reservoir. Accordingly, it is intended to embrace all such alternatives, modifications, and variations as fall within the spirit and broad scope of the appended claims.

What is claimed is:

1. In a hydrostatic transmission having a variable displacement pump and motor hydraulically interconnected to form a closed circuit for transmitting power therethrough, a reservoir source of fluid, and speed and direction of movement control means connected to at least one of said pump and motor and movable in opposite directions from a neutral position for controlling displacement to selectively produce forward and reverse direction of drive of said motor when the power flow is from said pump to said motor of said unit, means to limit the acceleration of said hydrostatic transmission upon the engagement of said pump and said motor of said transmission comprising:

a pair of high pressure drive relief valves (19 and 19a) communicatively connected across said closed circuit and normally closed to fluid flow between opposite sides of said closed circuit, each high pressure drive relief valve being operatively responsive to development of an excessive pressure in said pump and motor closed circuit for short circuiting fluid flow between opposite sides of said circuit;

a reverse pilot relief valve (45);

a forward pilot relief valve (46);

said reverse and said forward pilot relief valves communicating with one each of said pair of high pressure drive relief valves by means of a first and a second conduit;

a dual cylinder solenoid operated valve (76) having two identical solenoid operated valves therein;

said dual cylinder solenoid operated valve communicating with said reverse (45) and forward (46) pilot relief valves by means of a first (70) and a second (70a) conduit;

a charging pump means communicating with said dual cylinder solenoid operated valve;

a hydraulic reservoir communicating with said dual cylinder solenoid operated valve and said charging pump;

a hydraulic circuit means providing communication between said reservoir, said charging pump, and said first and second solenoid operated valves;

an electrical circuit acting selectively to energize said dual cylinder solenoid operated valve whereby such energization causes a modulated closing of one of said forward or reverse two position pilot valves (45 or 46) thereby causing the modulated seating of one of said high pressure drive relief valves (19 or 19a) to gradually eliminate the short circuited mode of the hydrostatic transmission.

2. The invention in accordance with claim 1 wherein said electrical circuit includes:

a pair of normally opened switches;

a direction control means whereby said normally opened switches are engageably contacted by said direction control means into a plurality of positions including a neutral position, a forward direction of drive travel and reverse direction of drive travel.

3. The invention in accordance with claim 1 wherein said reverse pilot relief valve includes a first orifice capable of receiving fluid from a reverse high pressure drive relief valve, a second orifice capable of communicating with said dual cylinder solenoid operated valve and a third orifice capable of communicating with said reservoir.

4. The invention in accordance with claim 1 wherein said forward pilot relief valve includes a first orifice capable of receiving fluid from a forward high pressure drive relief valve, a second orifice capable of communicating with said dual cylinder solenoid operated valve and a third orifice capable of communicating with said reservoir.

5. The invention in accordance with claim 1 wherein said electrical circuit provides that said dual cylinder solenoid operated valve allows passage of fluid when said dual cylinder solenoid operated valve is deenergized.

6. The invention in accordance with claim 1 wherein said electrical circuit, when energized, allows flow of hydraulic fluid between said dual cylinder solenoid operated valve and said reverse and said forward pilot relief valves.

7. In a hydrostatic transmission for use in transmitting driving effort from an engine to a driven member, the hydrostatic transmission having a variable displacement pump and a motor having fluid communication by means of fluid conduits therebetween, a source of hydraulic fluid for supplying fluid under pressure, and a control rod for effecting the output of the pump and motor the improvement comprising:

a reverse high pressure drive relief valve (19) having a body retaining a spring loaded relief valve integral with said variable displacement pump and said motor;

a forward high pressure drive relief valve (19a) having a body retaining a spring loaded relief valve integral with said variable displacement pump and said motor;

a pilot relief valve assembly (44) having a reverse pilot relief valve (45) and a forward pilot relief valve (46) each having a pilot poppet valve (54 and 54a) which may be seated against the seat at an incremental pressure which may be varied by a spring and a piston;

a pair of pilot control conduits (41 and 41a) allowing fluid flow between said reverse and said forward high pressure drive relief valves and said pilot relief valve assembly whereby said reverse high pressure drive relief valve communicates with the reverse pilot relief valve and said forward high pressure drive relief valve communicates with the forward pilot relief valve;

a dual cylinder solenoid operated valve (76) receiving fluid under pressure from said supply source of fluid having two identical solenoid operated valves therein wherein one of the identical solenoid operated valves is capable of supplying fluid to the reverse pilot relief valve and the other of the identical solenoid operated valves is capable of supplying fluid to the forward reverse pilot relief valve;

a first conduit (70) allowing fluid flow from said dual cylinder solenoid operated valve to the reverse pilot relief valve;

a second conduit (70a) allowing fluid flow from said dual cylinder solenoid operated valve to the forward pilot relief valve;

a second conduit (70a) allowing fluid flow from said dual cylinder solenoid operated valve to the forward pilot relief valve;

a source of electrical energy which may energize each solenoid operated valve of said dual cylinder solenoid operated valve;

a drive selector switch responsive to the displaced position of said control rod having a normally opened reverse switch and a normally opened forward switch, each switch, when closed, being able to allow electrical energy to pass from said source of electrical energy to said dual cylinder solenoid operated valve;

electrical conduit means providing electrical energy passage from said drive selector switch to said dual cylinder solenoid operated valve and further providing energy passage from said source of electrical energy to said drive slector switch.

8. The invention in accordance with claim 7 wherein the displacement of said control rod to close one of either of said normally opened reverse switch or normally opened forward switch results in the passage of fluid under pressure from said source of fluid pressure through one of said solenoid operated valves to said pilot relief valve assembly to increase the pressure exerted by said pilot poppet valve against said seat.

9. The invention in accordance with claim 7 wherein each of said reverse and said forward pilot relief valves of said pilot relief assembly comprises:

a body having a cylindrical bore therethrough and a plurality of apertures associated therewith including a threaded aperture, a threaded coupling and an outlet opening;

a piston slidably carried in said bore capable of being displaced by fluid pressure acting on said piston from said threaded aperture;

a pilot poppet valve slidably carried in said bore capable of preventing fluid flow from said threaded coupling to said outlet opening;

a spring positioned between said piston and said pilot poppet valve urging said pilot poppet valve away from said piston;

a seat having an aperture integral with said threaded coupling;

a pilot control conduit allowing fluid flow from one of said reverse and forward high pressure drive relief valves to said threaded coupling whereby said piston may urge said spring to bias said pilot poppet valve against said seat to restrict fluid flow through said threaded coupling from said reverse drive relief valve.

10. The invention in accordance with claim 7 wherein said dual cylinder solenoid operated valve is comprised of a pair of identical solenoid operated valves each of them further comprising:

a housing having a plurality of apertures including a flow controlling inlet orifice, a port and an inlet opening;

a cylindrical cavity formed in said housing;

a nonmovable sleeve equipped with a restrictive passage at one end thereof and a bore at the other end thereof;

a piston having an inboard and an outboard end slidably carried in said bore of said nonmovable sleeve, said piston having a resiliently deformable insert carried at each end thereof with the inboard end capable of blocking fluid flow from said restrictive passage of said nonmovable sleeve, said piston further having a plurality of longitudinal grooves along the exterior length thereof;

a spring normally biasing said piston outward from said bore of said nonmovable sleeve;

a restricting orifice capable of allowing fluid flow normally blocked by said resiliently deformable insert of the outboard end of said piston which is normally biased outwardly from said bore of said nonmovable sleeve;

a passage allowing fluid to be delivered from said flow controlling inlet orifice to said restricting orifice;

a solenoid coil capable of being energized by said source of electrical energy which when energized retracts said piston from said restricting orifice allowing fluid to flow through said restricting orifice and through said port in said housing to said pilot relief valve assembly whereby said pilot poppet valve of said pilot relief valve assembly will be seated against said seat.

11. In a hydrostatic transmission for use in transmitting driving effort from an engine to a driven member, the hydrostatic transmission having a variable displacement pump and a motor having fluid communication by means of fluid conduits therebetween, a source of hydraulic fluid for supplying fluid under pressure, and a control rod for effecting the output of the pump and motor the improvement comprising:

a reverse high pressure drive relief valve having a body retaining a spring loaded relief valve integral with said variable displacement pump and said motor;

a forward high pressure drive relief valve having a body retaining a spring loaded relief valve integral with said variable displacement pump and said motor;

a pilot relief valve assembly having a reverse pilot relief valve and a forward pilot relief valve each having a pilot poppet valve which may be seated against a seat at an incremental pressure which may be varied;

a pair of pilot control conduits allowing fluid flow between said reverse and said forward high pressure drive relief valves and said pilot relief valve assembly whereby said reverse high pressure drive relief valve communicates with the reverse pilot relief valve and said forward high pressure drive relief valve communicates with the forward pilot relief valve;

a dual cylinder solenoid operated valve receiving fluid under pressure from said supply source of fluid having two identical solenoid operated valves therein wherein one of the identical solenoid operated valves is capable of supplying fluid to the reverse pilot relief valve and the other of the identical solenoid operated valves is capable of supplying fluid to the forward reverse pilot relief valve;

a first conduit allowing fluid flow from said dual cylinder solenoid operated valve to the reverse pilot relief valve;

a second conduit allowing fluid flow from said dual cylinder solenoid operated valve to the forward pilot relief valve;

a source of electrical energy which may energize each solenoid operated valve of said dual cylinder solenoid operated valve;

a drive selector switch responsive to the displaced position of said control rod having a normally closed reverse switch and the normally closed forward switch, each switch, when opened, capable of interrupting the flow of electrical energy from said source of electrical energy to said dual cylinder solenoid operated valve;

electric conduit means providing electrical energy passage from said drive selector switch to said dual cylinder solenoid operated valve and further providing energy passage from said source of electrical energy to said drive selector switch.

12. The invention in accordance with claim 11 wherein the displacement of the control rod to open said normally closed reverse switch results in the interruption of fluid flow from said source of fluid pressure through said dual cylinder solenoid operated valve to said pilot relief valve assembly to decrease the pressure exerted by said pilot poppet valve against said seat.

* * * * *